(12) United States Patent
Hirschfeld et al.

(10) Patent No.: US 6,990,666 B2
(45) Date of Patent: Jan. 24, 2006

(54) NEAR ON-LINE SERVER

(75) Inventors: Robert A. Hirschfeld, Metairie, LA (US); Dave D. McCrory, Destrehan, LA (US)

(73) Assignee: Surgient Inc., Austin, TX (US)

( * ) Notice: Subject to any disclaimer, the term of this patent is extended or adjusted under 35 U.S.C. 154(b) by 11 days.

(21) Appl. No.: 10/202,754

(22) Filed: Jul. 25, 2002

(65) Prior Publication Data

US 2003/0177176 A1 Sep. 18, 2003

Related U.S. Application Data

(63) Continuation-in-part of application No. 10/124,195, filed on Apr. 17, 2002, which is a continuation-in-part of application No. 10/100,216, filed on Mar. 18, 2002.

(51) Int. Cl.
*G06F 9/46* (2006.01)
*G06F 15/16* (2006.01)
*G06F 15/173* (2006.01)

(52) U.S. Cl. .................. 718/104; 709/203; 709/226
(58) Field of Classification Search ............ 718/1–108; 709/200–253
See application file for complete search history.

(56) References Cited

U.S. PATENT DOCUMENTS

| | | | |
|---|---|---|---|
| 4,912,628 A | 3/1990 | Briggs | |
| 5,062,037 A | 10/1991 | Shorter et al. | |
| 5,201,049 A | 4/1993 | Shorter | |
| 5,611,050 A | 3/1997 | Theimer et al. | |
| 5,802,290 A | 9/1998 | Casselman | |
| 5,996,026 A | 11/1999 | Onodera et al. | |
| 5,999,518 A * | 12/1999 | Nattkemper et al. | 370/258 |
| 6,003,050 A | 12/1999 | Silver et al. | |
| 6,041,347 A | 3/2000 | Harsham et al. | |
| 6,067,545 A * | 5/2000 | Wolff | 707/10 |
| 6,069,894 A * | 5/2000 | Holender, deceased et al. | 370/397 |
| 6,075,938 A | 6/2000 | Bugnion et al. | |
| 6,104,699 A | 8/2000 | Holender et al. | |
| 6,185,601 B1 * | 2/2001 | Wolff | 709/203 |
| 6,256,637 B1 | 7/2001 | Venkatesh et al. | |
| 6,263,358 B1 * | 7/2001 | Lee et al. | 709/100 |
| 6,272,523 B1 | 8/2001 | Factor | |
| 6,272,537 B1 | 8/2001 | Kekic et al. | |
| 6,370,560 B1 * | 4/2002 | Robertazzi et al. | 709/105 |
| 6,496,847 B1 | 12/2002 | Bugnion et al. | |

(Continued)

OTHER PUBLICATIONS

Henry Baltazar, Virtual Storage Age, eWEEK, pp. 45 and 48, Aug. 27, 2001, Ziff Davis Media Inc., New York, New York.

(Continued)

*Primary Examiner*—Meng-Al T. An
*Assistant Examiner*—Kenneth Tang
(74) *Attorney, Agent, or Firm*—Gary R. Stanford

(57) ABSTRACT

A dynamic state manager (DSM) for a server cloud manager (SCM) of a virtualized logical server cloud including a resource definition, a rules module and a state manager engine. The resource definition incorporates information of the available physical and logical resources of the server cloud, including cost, priority, usage and demand information of the resources. The resource definition further incorporates dependencies and relationships between physical and logical resources. The rules module includes predetermined behavioral rules based on demand, usage, priority and cost information. The behavioral rules define optimized resource utilization of the resources of the server cloud. The state manager engine is linked to the resource definition and the rules module and cooperates with the SCM to apply the behavioral rules to achieve optimized resource utilization.

18 Claims, 7 Drawing Sheets

U.S. PATENT DOCUMENTS

| | | | |
|---|---|---|---|
| 6,567,839 B1 * | 5/2003 | Borkenhagen et al. | 709/103 |
| 6,633,916 B2 * | 10/2003 | Kauffman | 709/229 |
| 6,640,239 B1 * | 10/2003 | Gidwani | 709/203 |
| 2002/0065864 A1 * | 5/2002 | Hartsell et al. | 709/100 |
| 2002/0129082 A1 * | 9/2002 | Baskey et al. | 709/102 |
| 2003/0023774 A1 * | 1/2003 | Gladstone | 709/328 |

OTHER PUBLICATIONS

Michael Vizard, Automated help is on the horizon, Info-World, Mar. 1, 2002, InfoWorld Media Group, San Francisco, CA.

* cited by examiner

NEAR ON-LINE SERVER

CROSS-REFERENCE TO RELATED APPLICATION(S)

The present application is a Continuation-In-Part of U.S. Patent Application entitled "Virtual Server Cloud Interfacing", Ser. No. 10/124,195, filed Apr. 17, 2002, which itself is a Continuation-In-Part of U.S. Patent Application entitled "Virtualized Logical Server Cloud", Ser. No. 10/100,216, filed Mar. 18, 2002, in which are all hereby incorporated by reference in their entireties.

FIELD OF THE INVENTION

The present invention relates to virtualization server technology, and more particularly to dynamic state manager (DSM) for a server cloud manager (SCM) of a virtualized logical server cloud that performs file and server image management for logical servers.

DESCRIPTION OF RELATED ART

Virtualization technology enabled multiple logical servers to operate on a single physical computer. Previously, logical servers were tied directly to physical servers because they relied on the physical server's attributes and resources for their identity. Virtualization technology weakened this restriction by allowing multiple logical servers to override a physical server's attributes and share its resources. Each logical server is operated substantially independent of other logical servers and provides virtual isolation among users effectively partitioning a physical server into multiple logical servers.

A first prior disclosure introduced virtualization that enabled complete separation between logical and physical servers so that a logical server may exist independent of a specific physical server. The logical server cloud virtualization added a layer of abstraction and redirection between logical and physical servers. Logical servers were implemented to exist as logical entities that were decoupled from physical server resources that instantiated the logical server. Decoupling meant that the logical attributes of a logical server were non-deterministically allocated to physical resources, thereby effectively creating a cloud of logical servers over one or more physical servers. The prior disclosure described a new deployment architecture which applied theoretical treatment of servers as logical resources in order to create a logical server cloud. Complete logical separation was facilitated by the addition of the SCM, which is an automated multi-server management layer. A fundamental aspect to a logical server cloud is that the user does not have to know or provide any physical server information to access one or more logical server(s), since this information is maintained within the SCM. Each logical server is substantially accessed in the same manner regardless of underlying physical servers. The user experiences no change in access approach even when a logical server is reallocated to a different physical server. Any such reallocation can be completely transparent to the user.

A second prior disclosure built upon logical server cloud virtualization by adding a layer of abstraction and redirection between logical servers and the server clouds as managed and controlled by corresponding SCMs. The server cloud was accessed via its SCM by a user via a user interface for accessing logical and physical servers and by the logical and physical servers themselves, such as via logical and/or physical agents as previously described. SCMs interfaced each other according to predetermined relationships or protocols, such as "peer" SCMs or server clouds or between a server cloud and a "super peer", otherwise referred to as an "Exchange". The second disclosure introduced the concept of a "subcloud" in which an SCM interfaced or communicated with one or more logical and/or physical servers of another server cloud. The SCM of the server cloud operated as an intermediary or proxy for enabling communication between a logical server activated within a remote cloud. Logical servers could be moved from one server cloud to another or replicated between clouds. A remote SCM could manage one or more logical servers in a subcloud of a remote server cloud. In fact, a logical server might not be aware that it was in a remote cloud and may have behaved as though it resided in the same cloud as the SCM managing its operations. The proxy functionality enabled transparency between users and logical servers. The user of a logical server may or may not be aware of where the logical server existed or in which server cloud it is instantiated.

Many advantages and capabilities were enabled with cloud to cloud interfacing. Routing, switching, replication and cloud balancing may be performed intercloud, such as between "trusted" clouds, extracloud, such as between "untrusted" clouds, or via an intermediary (e.g., super-peer, supercloud, shared storage, exchange) in which actions requested of one SCM were transparently performed by a different SCM. An exchange cloud could be established that had predetermined commercial relationships with other clouds or that was capable of querying public or otherwise accessible clouds for resource information. Such an exchange cloud could be established on a commercial basis, for example, to provide a free market exchange for servers or services related thereto. Exchange clouds included intercloud proxy and predetermined business rules and relationships to conduct commercial transactions. Such commercial transactions might include, for example, sale or lease of logical servers on the market through a common exchange and medium, such as the Internet.

It is appreciated, however, that each logical server implementation may consume a significant amount of physical resources, including processor capacity, memory usage, and/or disk space. Although it may be possible to provide a sufficient amount of physical resources to support all authorized demands simultaneously, such a system would be very costly and result in a significant waste of physical resources. It is rare that all possible demands are made at the same time; instead, system load is dynamic and variable over time and often includes one or more peak usage periods. Server systems may be designed based on peak usage, including an extra resource buffer to increase the probability that demands will be met at all times including peak periods. Such systems, however, often result in a substantial inefficient use of resources over time, and do not allow for significant over-subscription of resources. It is desired to build on server cloud capabilities to maximize utilization of the physical resources underlying the logical resources. Such maximum utilization should enable various levels of over-subscription of resources to result in optimal cost performance. It is desired to optimize efficiency during all usage periods including peak usage periods.

SUMMARY OF THE PRESENT INVENTION

A dynamic state manager (DSM) for a server cloud manager (SCM) of a virtualized logical server cloud according to embodiments of the present invention includes a resource definition, a rules module and a state manager engine. The resource definition incorporates information of the available physical and logical resources of the server cloud, including cost, priority, usage and demand information of the resources and incorporates dependencies and relationships between physical and logical resources. The rules module includes predetermined behavioral rules based on demand, usage, priority and cost information. The behavioral rules define optimized resource utilization of the resources of the server cloud. The state manager engine is linked to the resource definition and the rules module and cooperates with the SCM to apply the behavioral rules to achieve optimized resource utilization.

The resource definition may include, for example, a physical resource module, a resource cost module, a resource priority module, a usage module and a demand module. The physical resource module incorporates information of the physical resources available to the server cloud and further incorporates resource dependencies and relationships between physical and logical resources. The resource cost module incorporates relative cost information associated with the available physical resources and logical servers. The resource priority module incorporates relative priority information of the authorized entities. The usage module incorporates current usage information of the available physical resources. The demand module incorporates current and pending demand information of the available physical resources. The demand module may incorporate anticipated demands information.

The physical resource module may incorporate information of processor, memory and storage resources. The resource cost module may further incorporate information concerning cost of usage of the processor, memory and storage resources and cost of moving logical server files between different types of storage or memory.

Various different logical server states may be defined for each logical server of the server cloud. The resource cost module may incorporate cost of switching logical server states and the rules module may incorporate a logical server decay rule that considers usage, relative cost and relative priority information to determine logical server state. For example, the logical server states may include an active state, a suspended state, an off state and at least one storage state. The storage states may include storage of logical server files on a local physical server and storage of logical server files on a local storage coupled to the server cloud. The logical server states may further include a remote state in which a logical server is located on a remote server cloud affiliated with the local server cloud.

The rules module may incorporate subscription management, contracts and business purposes rules that enable over-subscription of the server cloud to maximize resource utilization over time. The rules module may be configured to ensure availability of resources to meet highest priority demands.

An SCM for controlling logical servers and physical resources of a virtualized logical server cloud according to embodiments of the present invention includes core components and interface components, where the core components includes a DSM. The core components serve as a shared foundation to collectively manage events, validate and authorize server cloud users and agents, enforce predetermined requirements and rules, and store operation data. The interface components enable communication with and control of entities associated with the server cloud. The DSM applies predetermined behavioral rules based on demand, usage, priority and cost to optimize usage of logical and physical resources of the server cloud.

BRIEF DESCRIPTION OF THE DRAWINGS

A better understanding of the present invention can be obtained when the following detailed description of embodiments of the invention is considered in conjunction with the following drawings, in which.

DETAILED DESCRIPTION OF EMBODIMENT(S) OF THE INVENTION

Figure 1:
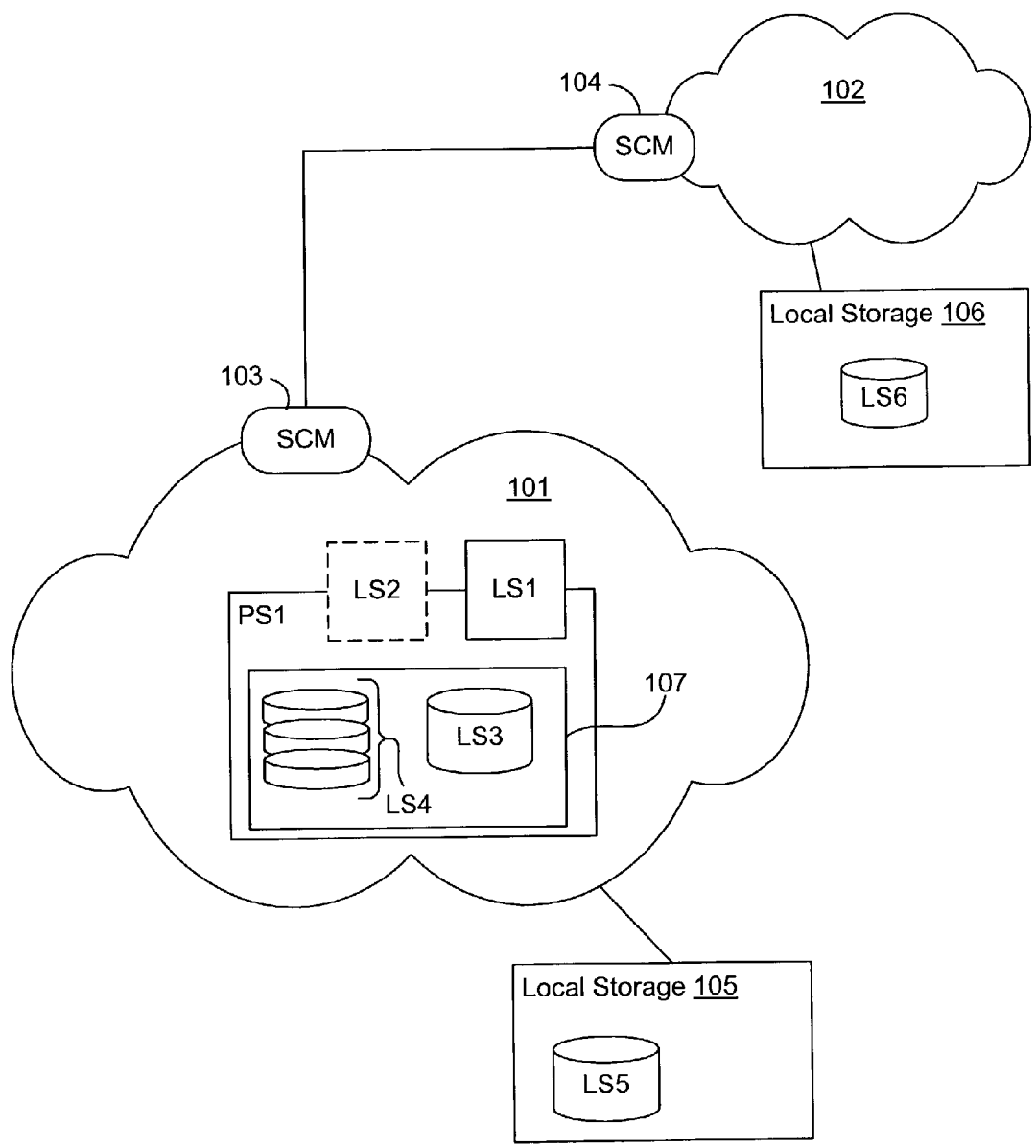
FIG. 1 is a figurative block diagram illustrating server cloud peers and various states of logical servers (LS) according to an embodiment of the present invention.

The following definitions are provided for this disclosure with the intent of providing a common lexicon. A "physical" device is a material resource such as a server, network switch, or disk drive. Even though physical devices are discrete resources, they are not inherently unique. For example, random access memory (RAM) devices and a central processing unit (CPU) in a physical server may be interchangeable between like physical devices. Also, network switches may be easily exchanged with minimal impact. A "logical" device is a representation of a physical device to make it unique and distinct from other physical devices. For example, every network interface has a unique media access control (MAC) address. A MAC address is the logical unique identifier of a physical network interface card (NIC). A "traditional" device is a combined logical and physical device in which the logical device provides the entire identity of a physical device. For example, a physical NIC has its MAC address permanently affixed so the physical device is inextricably tied to the logical device.

A "virtualized" device breaks the traditional interdependence between physical and logical devices. Virtualization allows logical devices to exist as an abstraction without being directly tied to a specific physical device. Simple virtualization can be achieved using logical names instead of physical identifiers. For example, using an Internet Uniform Resource Locator (URL) instead of a server's MAC address for network identification effectively virtualizes the target server. Complex virtualization separates physical device dependencies from the logical device. For example, a virtualized NIC could have an assigned MAC address that exists independently of the physical resources managing the NIC network traffic.

A "server cloud" or "cloud" is a collection of logical devices which may or may not include underlying physical servers. The essential element of a cloud is that all logical devices in the cloud may be accessed without any knowledge or with limited knowledge of the underlying physical devices within the cloud. Fundamentally, a cloud has persistent logical resources, but is non-deterministic in its use of physical resources. For example, the Internet may be viewed as a cloud because two computers using logical names can reliably communicate even though the physical network is constantly changing.

A "virtualized logical server cloud" refers to a logical server cloud comprising multiple logical servers, where each logical server is linked to one of a bank of physical servers. The boundary of the logical server cloud is defined by the physical resources controlled by a "cloud management infrastructure" or a "server cloud manager" or SCM. The server cloud manager has the authority to allocate physical resources to maintain the logical server cloud; consequently, the logical server cloud does not exceed the scope of physical resources under management control. Specifically, the physical servers controlled by the SCM determine a logical server cloud's boundary. "Agents" are resource managers that act under the direction of the SCM. An agent's authority is limited in scope and it is typically task-specific. For example, a physical server agent (PSA) is defined to have the authority to allocate physical resources to logical servers, but does not have the authority or capability to create administrative accounts on a logical server. An agent generally works to service requests from the server cloud manager and does not instigate actions for itself or on other agents.

FIG. 1 is a figurative block diagram illustrating server cloud peers and various states of logical servers (LS) according to an embodiment of the present invention. A server cloud 101 is managed by a first server cloud manager (SCM) 103 and a second server cloud 102 is managed by a second SCM 104. Each server cloud 101, 102 includes physical resources that are used to implement logical resources including logical servers. Each SCM 103, 104 includes core components (FIG. 2) and interface components that define how the SCM operates within the respective server cloud and how it interfaces external entities including other SCMs. The core components of an SCM include a shared library of functions used by all SCM components and interface components. The interface components are considered part of the SCM and establish interface with various entities. The term "entity" is intended to refer to one or more of various types of users (e.g., subscribers, administrators, etc.), agents (logical, physical), other SCMs, applications (including application "farms"), etc. Application examples include management applications, billing applications, resource applications, etc. Many managed functions or applications may or may not have specific users. For example, a batch processing system with varying load that is not associated with any particular user(s) may be managed in accordance with embodiments of the present invention. In one embodiment, the interface components include an image manager 225 and a dynamic state manager 227. The present disclosure primarily concerns the configuration and operation of the dynamic state manager 227 and its cooperation with the other SCM functions to achieve the desired goals as further described below.

The server cloud 101 is coupled to or linked to a local storage 105 that stores files and information on a short or long-term basis. The local storage 105 may incorporate any combination of volatile and nonvolatile resources, any combination of short- or long-term type memory devices and may include storage resources of physical servers of the server cloud A (e.g., RAM and/or disk drives) and storage resources linked via a shared network. The term "storage" as used herein incorporates both short- and long-term memory types and any type of media types including removable media such as CD-ROM, Zip disks, floppy disks, or the like. Storage may also include communication links to one or more shared storage resources either separately or via the shared network. The local storage 101 may include a single device (e.g. System Area Network (SAN)) or may be divided into multiple physical and logical devices (e.g., File Transfer Protocol (FTP) and Network Attached Storage (NAS) or the like), may include RAID configurations or the like with redundant information to ensure data integrity, and is preferably configured to use multiple devices to ensure scalability. The SCM 103 is associated with or otherwise has subcloud rights in the remote server cloud 104, which may be a peer cloud or the like. The server cloud 102 includes its own local storage 106. The local storage 106 is configured in any suitable manner, such as any of the configurations described for the local storage 105.

As described further below, there are at least six (6) defined states of each logical server relative to a server cloud, as illustrated by logical servers LS1–LS6 relative to the 103 SCM of the server cloud 101. A first server LS1 is shown in a first highest or "active" state on a physical server PS1 within the server cloud 101. A second server LS2 is shown on the PS1 using dashed lines to represent a second highest state or "suspended" on PS1. A third server LS3 is in a third highest state while powered down or "off" while being stored on disk drive(s) 107 of PS1. A fourth server LS4 is shown in the fourth highest state while being stored on the disk drive(s) 107 of PS1 as a series of files rather than a registered server instance. A fifth server LS5 is shown in a fifth highest state since it is only stored in the local storage 105 of the server cloud 101 (and thus local to the SCM 103) and not consuming any physical server resources. A sixth server LS6 is considered to be in a sixth highest state since it is "remotely stored" and thus not local to the SCM 103. Each of the logical server states are described further below.

Figure 2:
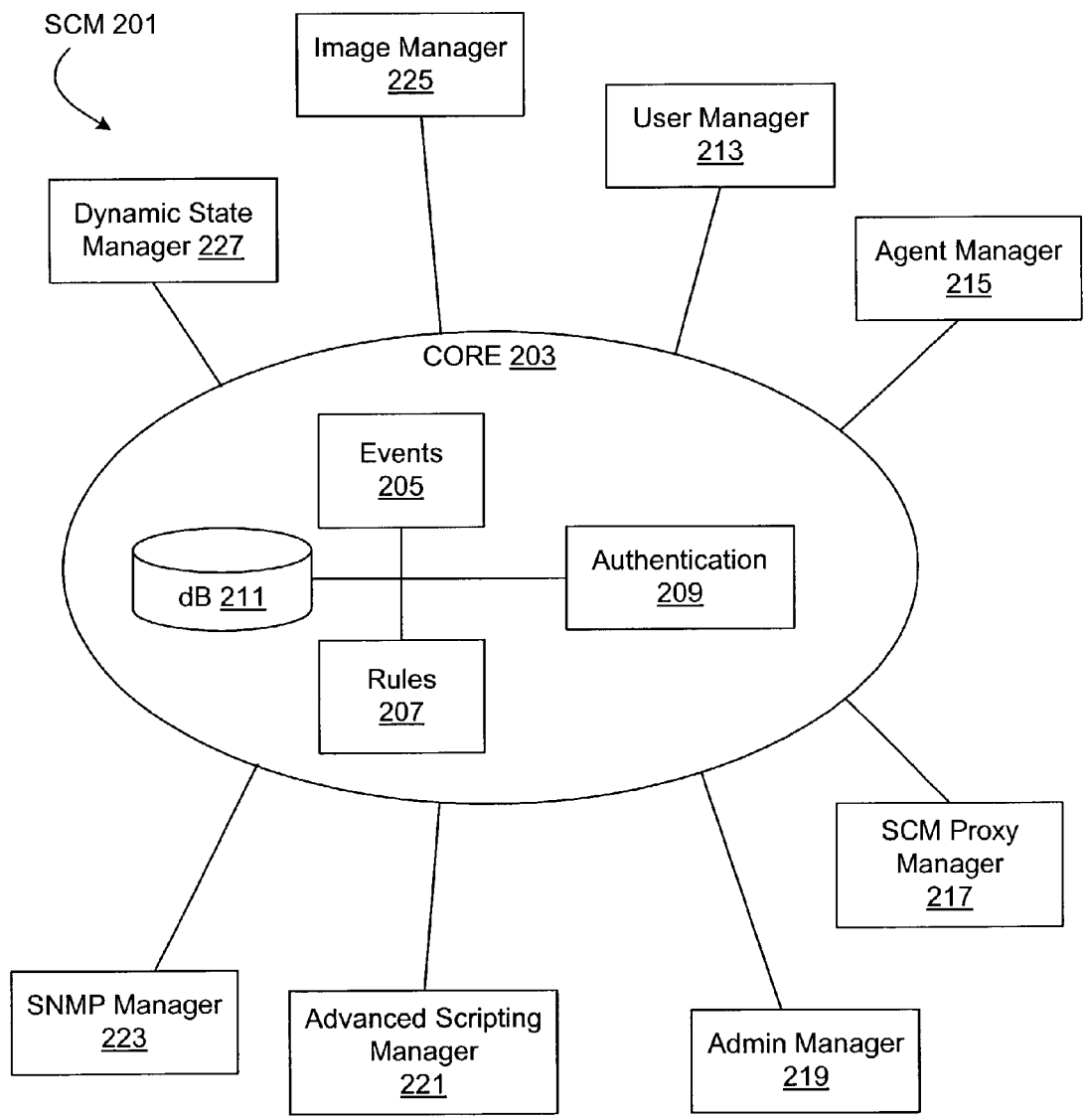
FIG. 2 is a block diagram illustrating the fundamental components of an exemplary SCM of a typical server cloud.

FIG. 2 is a block diagram illustrating the fundamental components of an exemplary SCM 201 of a typical server cloud. The SCM 201 is intended to be an exemplary embodiment of any of the SCMs described herein, including for example, the SCMs 103 and 104. The SCM 201 includes core components 203 and interface components that define how the SCM operates within the cloud and how it interfaces external entities including other SCMs. The core components 203 of the SCM 201 include an events engine 205, a rules engine 207, an authentication engine 209 and a database (dB) 211. The core components 203 comprise a shared library of functions used by all SCM components and interface components. The interface components are considered part of the SCM 201 and establish interface with external entities (e.g., users, administrators, agents, other SCMs, applications, etc.).

The database 211 stores data and parameters associated with the SCM 201 and generally defines how the SCM 201 tracks data and information. The database 211 is integrated with the core engines 205–209 and may even incorporate all or substantial parts of any one or more of the core engines 205–209. The database 211 includes, for example, data validation, data formatting, and rules validation. The event engine 205 controls and manages all of the events to be performed by the SCM 201, where such events are either immediately performed or queued for later execution. It is noted that "commands" and "actions" are generally synonymous and that "events" are commands or actions being performed or that represent an actual request to implement one or more commands. The rules engine 207 ensures that the SCM 201 operates in a consistent manner with respect to data and information and applies the appropriate level of security for each operation. The operations of the SCM 201 follow specific requirements and rules as validated and enforced by the rules engine 207, including, for example, credential and role information. The authentication engine 209 is used to validate users (explicit rights) and agents (implicit rights) and to generate and issue tokens or similar security credentials. The authentication engine 209 accesses the database 211 to assign the corresponding privileges attached to each role to the authenticated user according to that user's role or authorizations.

The SCM 201 may include one or more interface components that implement an interface layer, such as managers that implement interfaces with specific-type entities. Each interface component has its own needs and methods requirements and is designed to handle the operation of commands for specific entities. As shown, the interface components include a user manager 213, an agent manager 215, an SCM proxy manager 217, an administrator manager 219, an advanced scripting manager 221, a simple network management protocol (SNMP) manager 223, an image manager 225, and a dynamic state manager 227. The interface component managers shown and described herein are exemplary only, where each is optional depending upon the particular configuration and design criterion and where additional interface components may be defined, generated and deployed in a similar manner. Each SCM will have at least one interface component.

The user manager 213 manages access to the SCM 201 and the resources of the associated server cloud by users as previously described. The user manager 213 builds appropriate user interfaces and translates SCM data into useful screens or renderings for display or consumption by each user. The agent manager 215 coordinates SCM events with the appropriate agent(s) or other system components within the associated server cloud, such as physical server agents (PSA), logical server agents (LSA), etc. The SCM proxy manager 217 enables communication with other SCMs including proxy operations as described herein. The administrator manager 219 incorporates scripting logic and renders user interface(s) to administrators and provides useful access and control of the SCM 201 and the server cloud and associated functions to one or more administrators. The advanced scripting manager 221 enables a more sophisticated scripting interface with other management systems, such as a billing package or the like. The SNMP manager 223 enables communication with an SNMP management system or entity. The image manager 225 controls the state and instances of logical servers of the SCM 201. The dynamic state manager 227 enables optimized use of physical and logical resources and files throughout the entire domain of the SCM 201, including the physical and logical resources of its home cloud and associated resources within subclouds of other server clouds.

Figure 3:
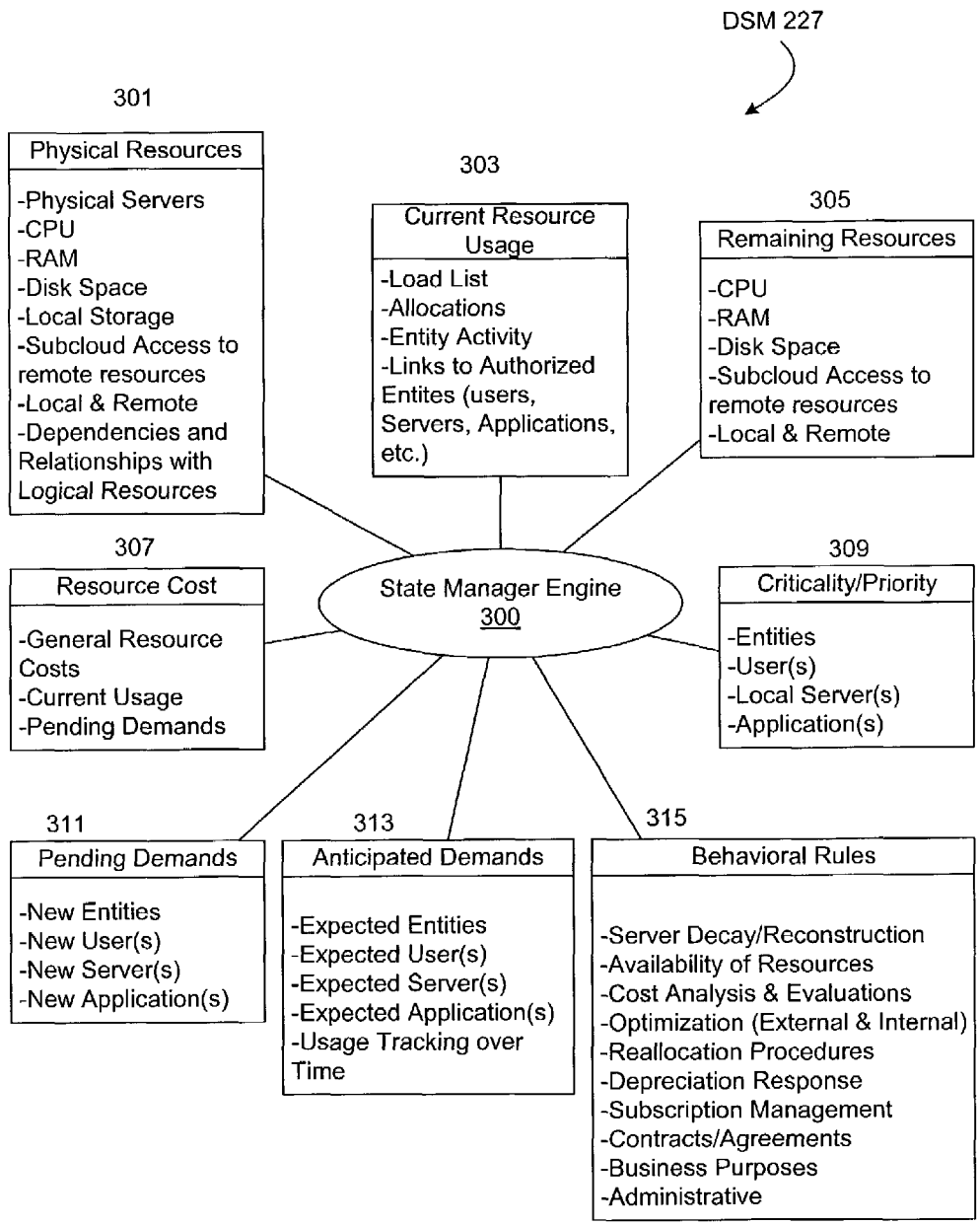
FIG. 3 is a more detailed block diagram of an exemplary embodiment of the dynamic state manager or DSM of the SCM of FIG. 2.

FIG. 3 is a more detailed block diagram of an exemplary embodiment of the dynamic state manager or DSM 227 of the SCM 201. The illustrated embodiment of the DSM 227 includes a state manager engine 300 linked with several functional blocks or modules 301–315 that collectively define its functions and capabilities. The modules may be implemented collectively or separately and linked together in any manner as known to those skilled in the art, such as a software program with associated routines and/or procedures. Each module comprises routines, lists, definitions, rules, or any other information associated with a respective function and incorporates or otherwise includes pointers or links to data and functional routines to perform the described functions. In the embodiment shown, the modules are cohesively linked together via the state manager engine 300 to provide a coherent system of resource allocation as described herein. Each module may also linked with one or more of the other SCM managers that enable performance of its function(s). It is appreciated that the DSM 227 shown is exemplary only in that any one or more of the illustrated modules may be modified or excluded and/or various other modules not shown be defined and included to achieve the goals and functions described herein.

The exemplary DSM 227 includes a Physical Resource module 301, which lists or otherwise provides access to and describes the capacity of the physical resources available to the SCM of the applicable server cloud. The Physical Resource module 301 includes, for example, the physical resources of the server cloud 101, including every physical server (e.g., PS1) and associated CPU, memory, disk space, and local storage resources available to the server cloud 101, such as the local storage 105. The Physical Resource module 301 also includes resources available via subcloud access rights, such as any physical resources or servers of the server cloud 102 via the SCM 104. The Physical Resource module 301 also incorporates any dependencies and relationships between logical and physical resources. It is appreciated that the resources of other server clouds have different costs and characteristics and that SCM 103 may have limited control or authorization rights of such remote resources. The Physical Resource module 301 also tracks changes in physical resources, such as any additional resources added (e.g., newly added physical servers, increase in local storage size, etc.), or reductions of resources (e.g., power failures, removal of physical servers, reduction of storage capacity, etc.).

The exemplary DSM 227 includes a Current Resource Usage module 303 that tracks current usage of the physical resources defined in the Physical Resource module 301, including a load list, resource allocations, entity activity, etc., and further links to associated authorized entities (e.g., users, servers, applications, etc.).

The exemplary DSM 227 includes a Remaining Resource module 305 that generally defines the resources listed in the Physical Resource module 301 that are not currently being used and that are available for new demands or loads. In effect, the Remaining Resource module 305 includes those resources that are not included in the Current Resource Usage module 303. A change in the amount of existing physical resources as tracked by the Physical Resource module 301 causes a concomitant change in the amount of remaining physical resources as tracked by the Remaining Resource module 305.

The exemplary DSM 227 includes a Resource Cost module 307 that defines the relative cost of each of the resources listed in the Physical Resource module 301. The Resource Cost module 307 is employed to describe the costs of resources currently being used as listed in the Current Resource Usage module 303 and the costs of available resources as listed in the Remaining Resource module 305. Cost may be measured using a variety of different metrics associated with each type of resource and desired function. Regarding memory, for example, the RAM of a local physical server has a higher cost in terms of usage than the local storage 101, which may have a higher usage cost than long term storage provided at a remote location. However, the cost in terms of restore time is highest for the remote storage, lower for local storage and lowest for the RAM of the local physical server. An array of cost metrics and factors are continuously monitored and evaluated to optimize utilization of the physical resources under dynamic loads and conditions.

The exemplary DSM 227 includes a Criticality/Priority module 309 that lists the relative priority of every authorized entity including those being tracked via the Current Resource Usage module 303 and those offline. The exemplary DSM 227 includes a Pending Demands module 311 that detects all new demands on the associated server cloud in which a request for resources has been made but that is not yet being handled. In this manner, the relative priority of a pending entity may be compared to those of active entities in the event that there are insufficient resources to handle all pending demands in the system given current usage. The exemplary DSM 227 includes an Anticipated Demands module 313 that is used to identify or otherwise anticipate new demands on the associated server cloud. Anticipated demands may be determined in a variety of ways. For example, anticipated demands may be identified by agreement in which it is known that certain demands will be made at certain times. Or, demands may be anticipated based on usage tracking and history statistics that identify certain demands or levels of demand at certain times or time ranges, such as peak usage hours or the like.

The exemplary DSM 227 includes a Behavioral Rules module 315 that applies predetermined behavioral rules and determinations based on information provided by the other modules 301–313 to facilitate management to optimize resource usage. For example, if there are insufficient resources available as identified by the Remaining Resources module 305 to handle all of the new demands identified by the Pending Demands module 311, the Behavioral Rules module 315 employs the Criticality/Priority module 309 to effectively rank the relative priorities of current entities versus entities requesting resources. If any one or more of the requesting entities have a higher priority or criticality than current entities and if there are insufficient resources to handle all current and new demands, then the Behavioral Rules module 315 is used to determine which current entities are terminated in order to provide sufficient resources to handle the highest priority demands. Also, the Behavioral Rules module 315 is used to determine how and when to terminate existing usage to handle new demands. In general, all of the resources are applied first to the highest priority entities, and any remaining resources are then used to satisfy the highest of the remaining demands. The Behavioral Rules module 315 incorporates a relatively complex set of rules and routines to maximize usage at all times.

As described previously and with reference to FIG. 1, there are six (6) defined states of each of the logical servers LS1–LS6 relative to SCM1. The DSM 227 controls the state of each logical server based on usage and behavioral rules. Each state is characterized as a complex tradeoff between a plurality of factors, including, for example, cost of resource utilization, cost of restoration, priority, usage, etc. LS1 is in the highest active state since activated on the PS1, where the active state is characterized as up and running on and consuming the resources of the physical server PS1. The SCM 103 maintains the persistent, semi-persistent and non-persistent attributes of LS1 and LS1 consumes the physical resources of PS1, including RAM (memory), CPU (processing), disk (storage), among other possible resources. It is appreciated that an active logical server generally consumes the highest level physical resources and is immediately available to one or more authorized entities.

LS2 is shown in the suspended state on PS1 in which the SCM 103 maintains its persistent, semi-persistent and non-persistent attributes. In this case, LS2 consumes virtually none of the processing capacity of PS1 since it is not activated. Nonetheless, LS2 does consume the memory and/or disk resources of PS1. In fact, LS2 may actually consume greater memory resources of PS1 since its active state information must be locally stored on PS1 while it is suspended. Since LS2 is not active, it must be restored from the suspended state to the active state. The restore time, however, is very short, such as a matter of a few seconds depending upon the capabilities of the physical resources. It is noted that specific restoration times and time periods are used herein in a relative manner as compared to other times or time periods (employing the same or similar physical resources) and may be different for different configurations or physical resources.

LS3 is in the third highest state in which it is local to the SCM 103 yet powered down or "off" while being stored on PS1. The SCM 103 maintains the persistent and semi-persistent attributes of LS3 although the non-persistent are lost and must be regenerated to reach a higher state. In this case, LS3 is registered as a logical server on PS1, yet consumes only limited resources of PS1, such as the disk space used to store the instance of LS3. Since LS3 is off and without all of its attributes, it must be booted or started to enter the active state. The restore time is relatively quick, such as on the order of matter of a minute or two (relative to only a few seconds for the restoration time of the suspended state).

LS4 is in the fourth highest state in which it is local to the SCM 103 and stored on PS1, but not registered as a logical server with PS1. In this case, PS1 does not recognize the files of LS4 as a logical server. The SCM 103 maintains the persistent attributes of LS4 whereas the semi-persistent and non-persistent attributes are lost and must be regenerated to reach a higher state. In this case, LS4 is not a server to PS1 yet consumes a portion of its disk space. Since LS4 only exists as a series of files, and since the SCM 103 only maintains its persistent attributes, LS4 must be constructed, registered and booted to enter the active state. The restore time is a little slower as compared to the restore time of the third state, such as a minute or two extra, since additional steps are needed.

LS5 is shown in a fifth highest state since it is stored in local storage 105 of the server cloud 101 (and thus local to SCM 103). The SCM 103 maintains only the persistent attributes of LS5. LS5 consumes only a portion of the local storage 105, which is considered less costly than the storage of any of the physical servers of the server cloud 101 including PS1. Since LS5 only exists as one or more files, and the SCM 103 only maintains its persistent attributes, LS5 must be retrieved from local storage into the storage of a target physical server, reconstructed on the physical server, registered and booted to enter the active state. The restore time is considerably longer given the size of the server files, such as on the order of several minutes (e.g., 10+ minutes).

LS6 is in the sixth highest state (lowest state) since it is not local to the SCM 103. In the configuration shown, LS6 is stored in the local storage 106 of the remote server cloud 102. It is noted that a remote server is considered in the sixth state relative to the local server regardless of its state or status (active, suspended, stored, etc.) in the remote cloud. The SCM 103 maintains only the persistent attributes of LS6 and LS6 does not consume any of the resources local to SCM 103. Since LS6 is remote, and since the SCM 103 only maintains its persistent attributes, LS6 is retrieved from the remote storage through any appropriate means, such as intermediate networks or the like, before being activated locally. The restore time is considerably longer than the restore time required from the local memory 105, such as on the order of one or more hours rather than minutes.

It is appreciated that other states including intermediate states may be defined. For example, a "virtual channel" state may be implemented by providing a virtual channel between the local storage 105 and PS1, in which PS1 remotely boots its disk via the local storage 105. This results in a faster boot time than copying the files locally, but may not be as fast as local disk boot. Another possible state is created by storing all of the logical server files in the physical server's memory and booting them from inside the memory thereby resulting in very fast boot times (i.e. a RAM drive). These options may be combined with the suspended state capability to decrease the boot time even further (the RAM drive time to be available could be under 5 seconds). It is also possible to cache some of the files locally and some remotely. For example the contents of the RAM of a suspended LS is saved locally or in a RAM disk and the Disk file is saved remotely.

The DSM 227 controls the state of each logical server and determines the appropriate state at any given time to achieve maximum utilization of resources. Server "decay" is defined as any transition from a higher state to a lower state to conserve or otherwise optimize resources. Server "reconstruction" is defined as any transition from a lower state to a higher state to activate or reactivate a server for immediate or pending usage. The DSM 227 monitors the user activity of a given logical server to determine logical server decay and/or reconstruction over time.

If a logical server in the highest or active state is idle for a predetermined "very short" period of time (e.g., such as several minutes to an hour), the DSM 227 may change its state to the suspended state to conserve CPU resources of the underlying physical server. The restore time from the suspended state to the active state is very short so that the state change is relatively inconsequential to the corresponding user(s) of that logical server.

If the same logical server continues to be idle for a predetermined "short" period of time (e.g., more than one hour or several hours), then the DSM 227 may change its state to off by powering down the logical server. The logical server remains stored on the physical server and registered, but its non-persistent attributes are lost. The restore time from the powered down state is longer (e.g., 2 minutes), but is still relatively short and might be expected by the user due to inactive.

If the same logical server continues to be idle for a predetermined "intermediate" period of time (e.g., several hours to one day), then the DSM 227 may change its state to the fourth highest state by de-registration and file breakdown of the logical server. The logical server files remain on the physical server, but its semi-persistent attributes are lost and the logical server is no longer registered with the physical server as a logical server. The restore time from the fourth state is not much longer than the restore time from the third state (e.g., 3 minutes).

If the same logical server continues to be idle for a predetermined "long" period of time (e.g., several days), then the DSM 227 may change its state to the fifth state by moving the logical server files to the local storage 105. The physical server resources are completely freed from the logical server, which remains stored on relatively inexpensive storage memory. The restore time from the fifth state is longer (e.g., 10 or more minutes), but again might be expected by the user(s) given the period of inactivity. If the option is available to the local SCM, and if the same logical server continues to be idle for a predetermined "very long" period of time (e.g., several weeks to months), then the DSM 227 may change its state to the sixth state by moving the logical server files to remote storage, such as the local storage 104 of the remote server cloud 102. This option might only be used if local storage needs to be conserved and if the cost of the remote storage is less than local storage.

There are many factors that are incorporated into the Behavioral Rules module 311 and considered by the DSM 227 that can modify the server decay scenario previously described. One factor is criticality or priority. A logical server having a "mission critical" status or very high priority could be treated with different timing factors as compared to a logical server having lower priority. For example, any one or more of the very short, short, intermediate, long or very long periods are modified to even longer periods of time to reflect the higher priority. Also, any one or more of the lowest states may not be used at all for high criticality/priority applications. Certain logical servers might not be removed from the physical server or might remain in the local storage indefinitely in accordance with contracts or agreements.

Another factor is change in physical resources. If the available resources are increased, server decay and/or reconstruction may be modified for one or more servers to reflect the additional resources compared to the subscription level for the server cloud. Subscription level refers to the relative number and/or size of usage requirements maintained by a given server cloud. Alternatively, if the physical resources are reduced for any reason, the DSM 227 modifies decay time periods and procedures to accommodate the relative load at any given time to give preferential treatment to higher critical/priority demand. Another factor is relative demand. The DSM 227 also modifies decay time periods and procedures to accommodate the higher priority demands for peak periods of use as compared to low usage periods.

Figure 4A:
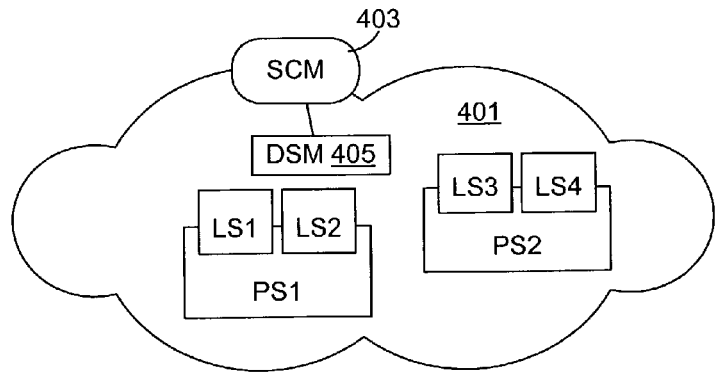
FIGS. 4A–4C are figurative block diagrams of the configuration changes of a server cloud over time in the event of a reduction in physical resources.
Figure 4B:
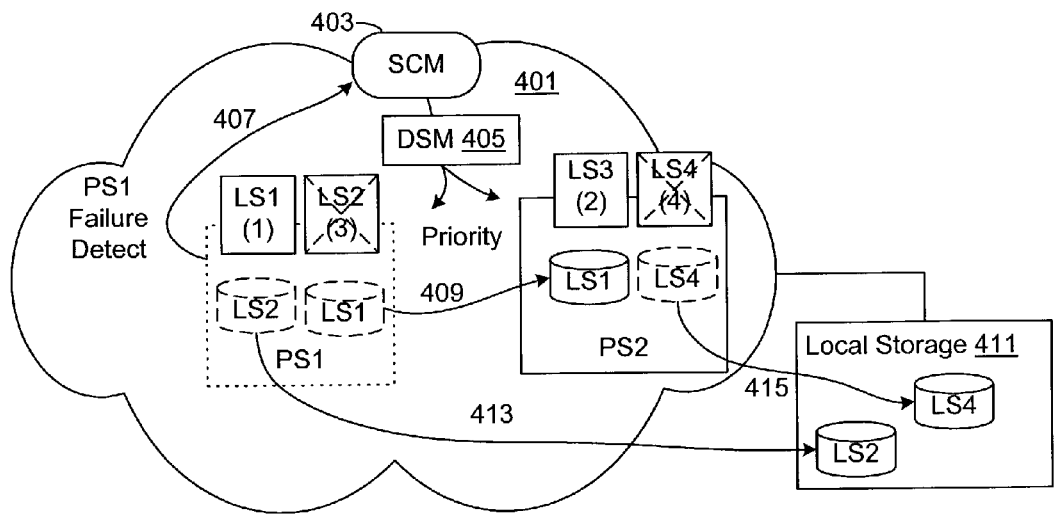
Figure 4C:
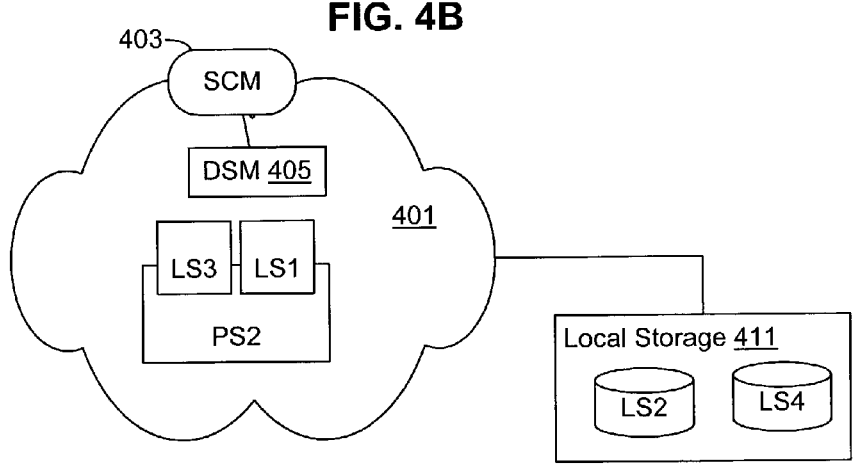

FIGS. 4A–4C are figurative block diagrams of the configuration changes of a server cloud 401 over time in the event of a reduction in physical resources. FIG. 4A illustrates the initial condition of the server cloud 401 managed by an SCM 403 that includes a DSM 405 that operates in a similar manner as the DSM 227. The server cloud 401 includes a first physical server PS1 with logical servers LS1 and LS2 and a second physical server PS2 with logical servers LS3 and LS4. The DSM 405 monitors status and activity of the physical servers PS1–PS2 and the logical servers LS1–LS4. FIG. 4B illustrates a physical server power down condition initiated by a PS1 failure detect indicated by arrow 407. In this exemplary illustration, the failure is not a sudden catastrophic failure but instead indicates failure of a component that will ultimately lead to failure unless PS1 is shut down (e.g., failure of a cooling fan). PSi is illustrated with dotted lines indicating its impending removal.

The DSM 405 timely assesses the impending change in physical resources and prioritizes current demand between the logical servers LS1–LS4. The resulting priority is shown in parenthesis within each logical server, so that LS1 has first priority (1), LS3 has second priority (2), LS2 has third priority (3), and LS4 has fourth and last priority (4). The DSM 405 determines that the physical resource PS2 remaining after power down of PS1 is able to handle the two highest priority loads of logical servers LS1 and LS3 after PS1 is removed, but is not able to handle the load of logical servers LS2 or LS4. Dashed lines "X" within the logical servers LS2 and LS4 indicate that they will be shut down until the physical server power down situation of PS1 is resolved. The logical servers LS1 and LS2 on PS1 are shut down and temporarily stored in the memory of PS1 as illustrated using dashed lines. LS1 is moved to the memory of PS2 as shown by arrow 409. The files of LS2 are moved to a local storage 411 coupled to cloud 401 as shown by arrow 413. After this is complete, the SCM 403 is able to shut PS1 down and resolve the power failure condition. Meanwhile, the files of LS4 either remain stored within the memory of PS2 or are moved to local storage 411 as shown by arrow 415. Also, LS1 is registered and powered up on PS2.

FIG. 4C illustrates the resulting configuration in which logical servers LS1 and LS3 are active on PS2 while PS1 is gone. Depending upon the relative capabilities of PS1 and PS2, it is likely that if the demand for LS2 and LS4 continues, that they will be invoked and operated on PS1 or a replacement server while the logical servers LS1 and LS3 remain on PS2.

Figure 5A:
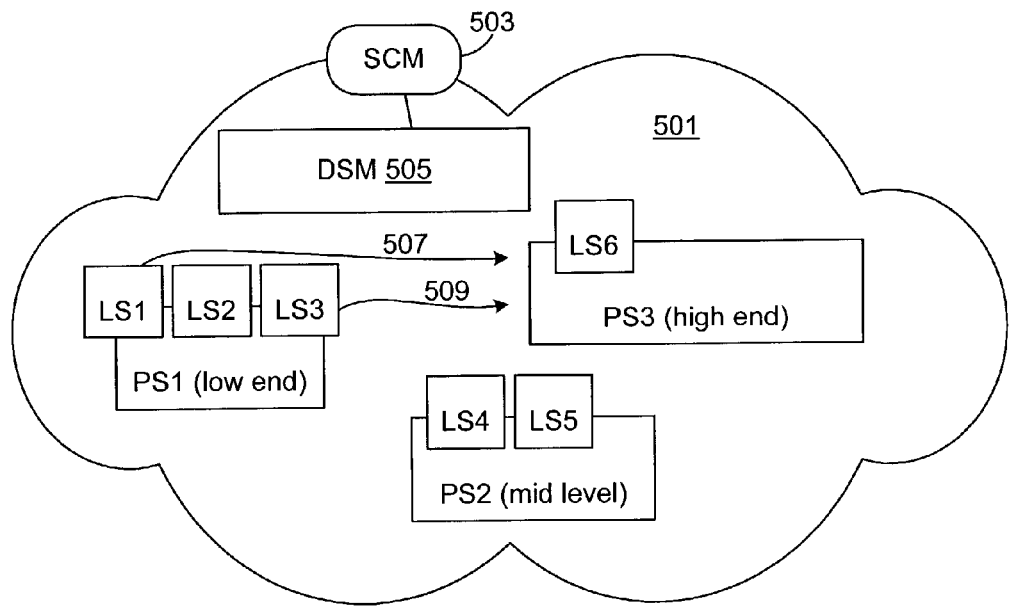
FIGS. 5A and 5B are figurative block diagrams illustrating exemplary configuration changes of a server cloud over time to perform intelligent self optimization of resource utilization based on server utilization.
Figure 5B:
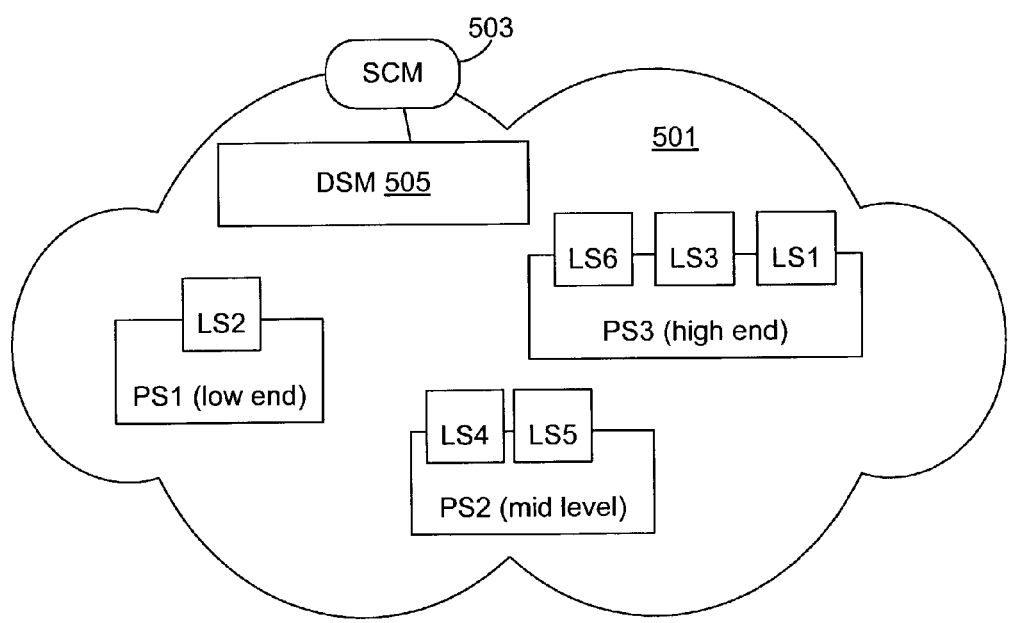

FIGS. 5A and 5B are figurative block diagrams illustrating exemplary configuration changes of a server cloud 501 over time to perform intelligent self optimization of resource utilization based on server utilization. FIG. 5A illustrates the initial condition of the server cloud 501 managed by an SCM 503 that includes a DSM 505 that operates in a similar manner as the DSM 227 previously described. The server cloud 501 includes a three physical servers PS1, PS2 and PS3, in which PS1 is a low end physical server (with limited capabilities and resources), PS2 is a mid level physical server (with intermediate capabilities and resources), and PS3 is a high end server (with relatively high capabilities and resources). Logical servers LS1–LS3 are operated on PS1, logical servers LS4 and LS5 are operated on PS2 and logical server LS6 is operated on PS3. The DSM 405 continuously monitors status and activity of the physical servers PS1–PS3 and the logical servers LS1–LS6.

Regardless of how the initial condition resulted, the DSM 505 determines that, relatively speaking, PS1 is over-utilized (or near maximum utilization) while PS3 is underutilized. One possible scenario for the initial condition shown in FIG. 5A is immediately after a peak period of usage in which several other servers were active on PS3 but were then shut down. As indicated by arrows 507 and 509, the DSM 505 determines that resource utilization is improved by moving logical servers LS1 and LS3 from PS1 to PS3. The result is shown in FIG. 5B in which logical servers LS1, LS3 and LS6 are operating on PS3, whereas LS2 remains active on PS1. The status of logical servers LS4 and LS5 on PS2 remains unchanged.

The intelligent self optimization of resource utilization operation illustrated in FIGS. 5A and 5B is an exemplary illustration of only one possible re-configuration result that may be different if other factors exist. For example, the DSM 505 may determine from the Anticipated Demands module 315 that additional demands are expected to be made in a relatively short period of time. Such determination may be made using any of several methods, such as according to statistical usage or in accordance with an existing agreement. The DSM 505 may determine that the initial condition shown in FIG. 5A is optimal since PS1 is near maximum utilization whereas PS3 is reserved for the expected new demands. In this manner, PS3 is reserved to handle the impending demands.

The DSM 505, through optimization and modeling logic, may also predict the need for additional resources such as Physical Server Resources or additional logical servers. Depending on configuration, the DSM 505 can satisfy this need via communication with its SCM 503 or via an external system or administrator.

Figure 6A:
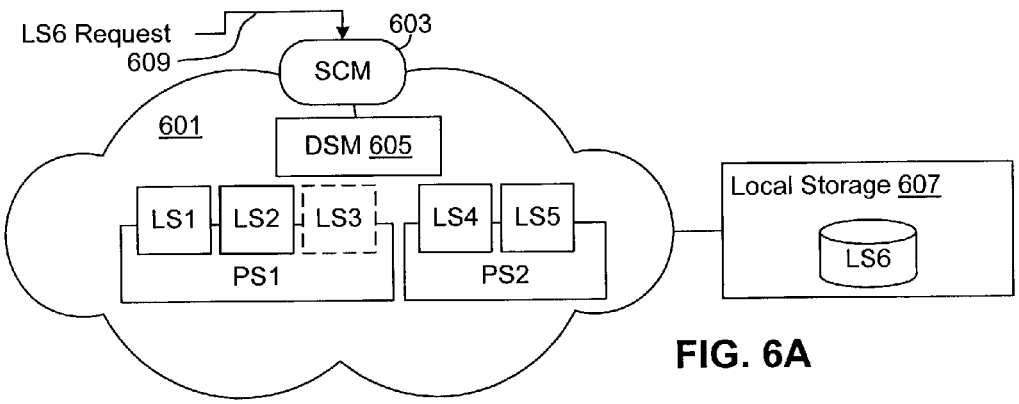
FIGS. 6A–6C are figurative block diagrams of the configuration changes of a server cloud over time to perform intelligent self optimization of resource utilization based on priority.
Figure 6B:
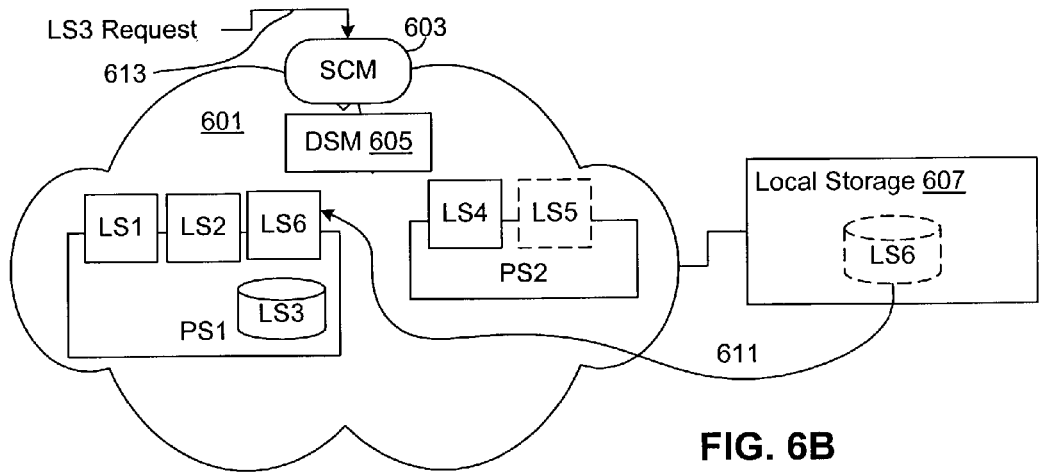
Figure 6C:
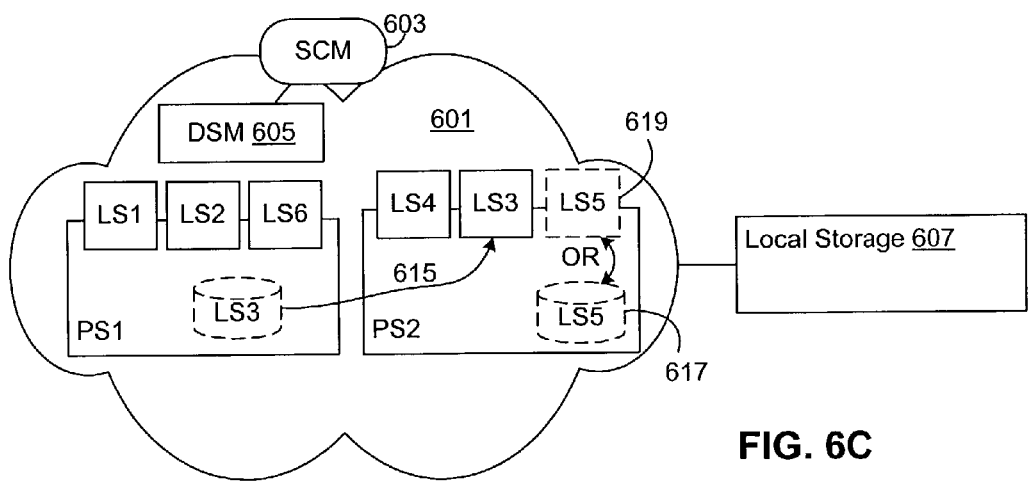

FIGS. 6A–6C are figurative block diagrams of the configuration changes of a server cloud 601 over time to perform intelligent self optimization of resource utilization based on priority. FIG. 6A illustrates the initial condition of the server cloud 601 managed by an SCM 603 that includes a DSM 605 that operates in a similar manner as the DSM 227. The server cloud 601 includes physical servers PS1 and PS2, where, for purposes of illustration, PS1 can support 3 active logical servers while PS2 can support only 2 active logical servers at any given time. The server cloud 601 is also coupled to a local storage 607 which stores the files of another logical server LS6. As shown, logical servers LS1–LS3 are operated on PS1 and logical servers LS4 and LS5 are operated on PS2. The DSM 605 continuously monitors status and activity of the physical servers PS1 and PS2 and the logical servers LS1–LS5 and any additional servers that may be activated, such as LS6. The logical server LS3 is currently in standby mode as illustrated by dashed lines due to a period of inactivity. A new request for logical server LS6 is received by the SCM 603 as illustrated by arrow 609.

As shown in FIG. 6B, the logical server LS3 is shut down and stored on PS1 while LS6 is retrieved from the local storage 607 and activated on PS1 as illustrated by arrow 611. This might occur, for example, if LS6 has the same or higher priority level than LS3 to justify shutting LS3 down. Thereafter, logical server LS5 is suspended due to inactivity as shown by dashed lines and a new request for logical server LS3 is received by the SCM 603 as shown by arrow 613. As shown in FIG. 6C and by arrow 615, logical server LS3 is moved from PS1 to PS2 and activated on PS2 to handle the new request. The logical server LS5 is shut down and stored on PS2 as shown at 617 to enable activation of LS3 since PS2 is only able to handle two active logical servers at a time in the illustrated embodiment. It is possible to leave LS5 in the suspended as shown at 619 while LS3 and LS4 are active, although LS5 would not be able to be placed in the active state due to the limited resources of PS2. If PS2 is able to handle additional servers including LS3, LS4 and LS5 at the same time, the DSM 605 might leave LS5 suspended while activating LS3.

Figure 7:
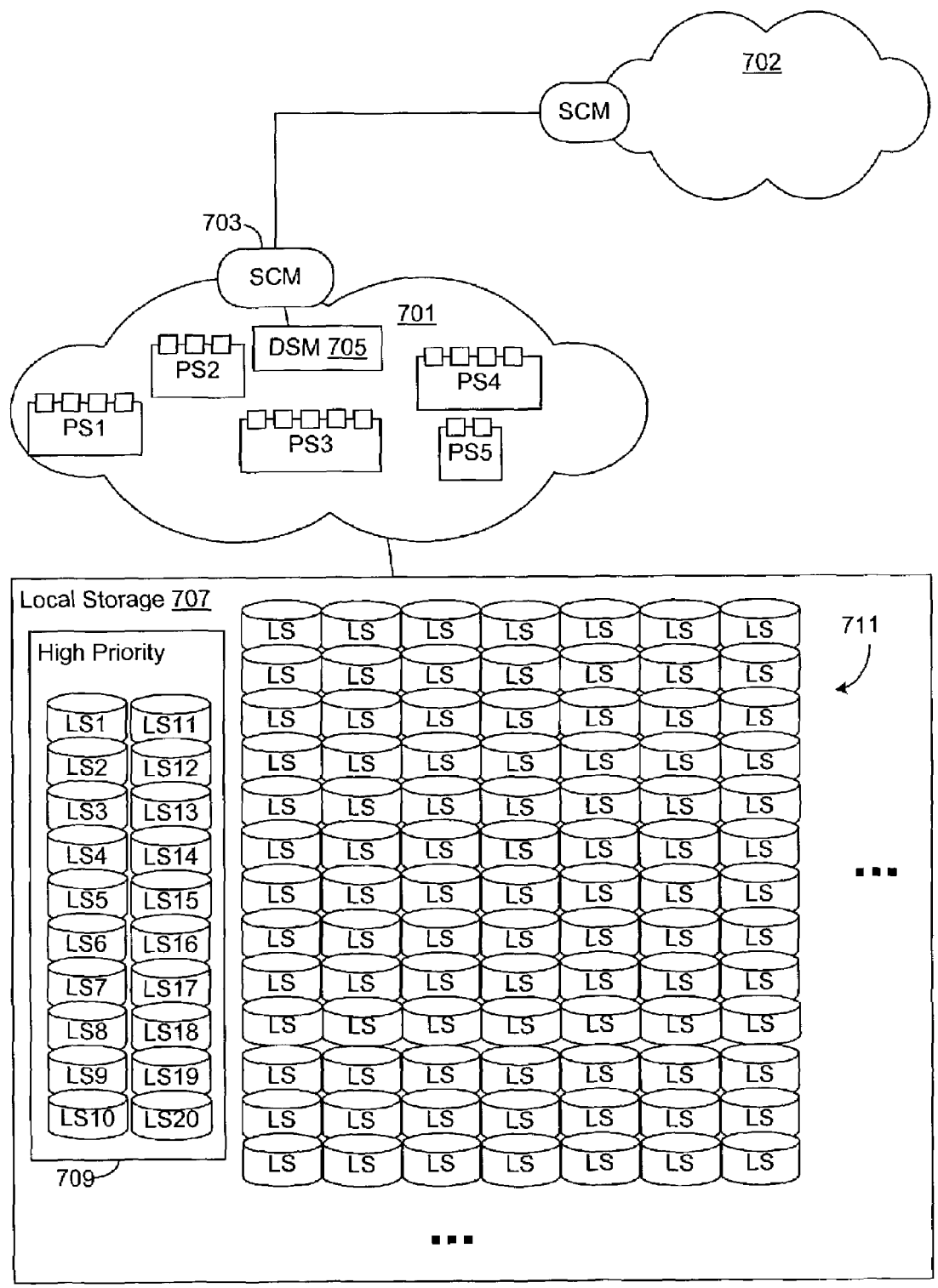
FIG. 7 is a figurative block diagram illustrating "over-subscription" and "massive" over-subscription of a server cloud.

FIG. 7 is a figurative block diagram illustrating "over-subscription" or "massive" over-subscription of a server cloud 701. A primary benefit of optimization of resource utilization as described herein is the ability to over-subscribe a server cloud to any desired level. Over-subscription is allocation of resources so that the available resources are insufficient to meet peak load, but not fully committed for average loads. Massive over-subscription is the allocation of resources so that available resources are fully committed during average loads so that servicing new resource requests require the system to free resources currently in use. The server cloud 701 is managed by SCM 703, which includes DSM 705 in a similar manner as previously described. The server cloud 701 includes a local storage 707 and several physical servers PS1–PS5 with various capacity levels. The local storage 707 stores several high priority logical servers 709 shown as LS1–LS20. The server cloud 701 has sufficient capacity to meet the needs of the logical servers LS1–LS20. However, additional lower priority subscriptions have been authorized, shown as a massively large array of low priority logical servers 711. Also, one or more remote server clouds 702 may have subcloud rights in the server cloud 701 with various priority levels.

The DSM 705 of the SCM 703 ensures that the high priority logical servers LS1–LS20 are given priority of service including peak usage times. Any remaining capacity over time is then provided to the low priority logical servers 711 in accordance with any priority scheme or algorithm, such as on a first-come, first-served (FCFS) basis. Also, a least-recently used (LRU) scheme may be employed to suspend and de-activate logical servers if and when demand surpasses available capacity of the server cloud 701. During peak loads or whenever demand exceeds the server cloud resources, the DSM 705 is actively employed to maximize resource utilization. Additional priority schemes are contemplated including most-frequently used (MFU) schemes in which logical servers that are most frequently used stay suspended on physical servers and least-frequently used (LFU) schemes in which logical servers are stored off to remote disk.

Although a system and method according to the present invention has been described in connection with one or more embodiments, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A virtualized logical server cloud comprising:
   physical resources comprising a plurality of networked physical servers executing virtualization software that virtualizes a portion of the physical resources to implement logical resources which includes at least one logical server;
   each logical server having a plurality of different activation states including an active state, a suspended state, an off state and at least one storage state, wherein each of the plurality of activation states consumes a successively reduced amount of the physical resources from the active state to the at least one storage state; and
   a server cloud manager (SCM) interfaced to the physical resources for managing operation and activation state of each logical server, the SCM including a dynamic state manager (DSM) comprising:
      a resource definition that incorporates information of the physical and logical resources of the virtualized logical server cloud, including cost, priority, usage and demand information of the physical and logical resources and that incorporates dependencies and relationships between the physical and logical resources;
      a rules module that comprises predetermined behavioral rules based on demand, usage, priority and cost information, wherein the behavioral rules define optimized utilization of the physical and logical resources of the virtualized logical server cloud; and
      a state manager engine, linked to the resource definition and the rules module, that cooperates with the SCM to apply the behavioral rules to control the activation state of each logical server of the virtualized logical server cloud between the active, suspended, off and storage states to achieve optimized utilization of the physical and logical resources.

2. The virtualized logical server cloud of claim 1, wherein the resource definition includes:
   a physical resource module that incorporates information of the physical resources available to the virtualized logical server cloud and that incorporates resource dependencies and relationships between the physical and logical resources;
   a resource cost module that incorporates relative cost information associated with the physical resources and each logical server;
   a resource priority module that incorporates relative priority information of entities authorized for each logical server;
   a usage module that incorporates current usage information of the physical resources; and
   a demand module that incorporates current and pending demand information of the physical resources.

3. The virtualized logical server cloud of claim 2, wherein the demand module incorporates anticipated demands information.

4. The virtualized logical server cloud of claim 2, wherein:
   the physical resource module incorporates information of processor, memory and storage resources; and
   wherein the resource cost module incorporates information concerning cost of usage of the processor, memory and storage resources and cost of moving logical server files between different types of storage or memory.

5. The virtualized logical server cloud of claim 4, wherein:
   the resource cost module incorporates cost of switching the activation state of each logical server; and
   wherein the rules module incorporates a logical server decay rule that considers usage, relative cost and relative priority information to determine the activation state of each logical server.

6. The virtualized logical server cloud of claim 1, wherein the at least one storage state includes storage of logical server files on a local physical server and storage of logical server files on a local storage coupled to the virtualized logical server cloud.

7. The virtualized logical server cloud of claim 1, wherein the plurality of different activation states further includes a remote state in which a logical server is located on a remote virtualized logical server cloud affiliated with the local virtualized logical server cloud.

8. The virtualized logical server cloud of claim 1, wherein the rules module incorporates subscription management, contracts and business purposes rules that enable oversubscription of the virtualized logical server cloud to maximize resource utilization over time.

9. The virtualized logical server cloud of claim 8, wherein the rules module ensures availability of the physical and logical resources to meet highest priority demands.

10. A server cloud management system that virtualizes physical resources comprising a plurality of networked physical servers into a virtualized logical server cloud including logical resources comprising at least one logical server and that manages operation of each logical server, the server cloud management system comprising:
    virtualization software executed on the physical servers for implementing each logical server; and
    a server cloud manager (SCM) for controlling each logical server and the physical and logical resources, each logical server capable of existing in any one of a plurality of different activation states including an active state, a suspended state, an off state and at least one storage state wherein each of the plurality of activation states consumes a successively reduced amount of the physical resources from the active state to the at least one storage state, the SCM comprising:

a plurality of core components that serve as a shared foundation to collectively manage events, validate and authorize virtualized logical server cloud users and agents, enforce predetermined requirements and rules and store operation data; and a plurality of interface components that enable communication with and control of entities associated with the virtualized logical server cloud, the interface components including a dynamic state manager (DSM) that applies predetermined behavioral rules based on demand, usage, priority and cost to control the activation state of each logical server of the virtualized logical server cloud between the active, suspended, off and storage states to optimize usage of the logical and physical resources of the virtualized logical server cloud.

11. The server cloud management system of claim 10, wherein the DSM comprises:

a resource definition that incorporates information of the physical and logical resources of the virtualized logical server cloud, the information including cost, priority, usage and demand information of the physical and logical resources;

a rules module that comprises predetermined behavioral rules based on the demand, usage, priority and cost information, wherein the behavioral rules define optimized resource utilization of the physical and logical resources of the virtualized logical server cloud; and a state manager engine, linked to the resource definition and the rules module, that cooperates with the core components and any other interface components of the SCM to apply the behavioral rules to achieve optimized resource utilization.

12. The server cloud management system of claim 11, wherein the DSM ensures best use of the physical resources over time under dynamic loads if any changes of availability of the physical resources occur.

13. The server cloud management system of claim 11, wherein the DSM ensures availability of the physical and logical resources to meet demands having highest criticality.

14. The SCM of claim 13, wherein the DSM enables over-subscription of the virtualized logical server cloud by optimizing utilization of remaining resources by demands having lower criticality.

15. The server cloud management system of claim 14, wherein the DSM facilitates massive over-subscription of the virtualized logical server cloud by maximizing utilization of the physical and logical resources over time.

16. The server cloud management system of claim 11, wherein:

the resource definition incorporates cost of processor, memory and storage resource usage information, cost of moving logical server files between different types of storage or memory, and cost of switching the activation state of each logical server; and wherein the rules module includes a logical server decay rule that considers usage, relative cost and relative priority information to determine the activation state of each logical server.

17. The server cloud management system of claim 10, wherein at least one storage state includes storage on a physical server and storage on a local storage coupled to the virtualized logical server cloud.

18. The server cloud management system of claim 10, wherein the plurality of different activation states includes a remote state in which a logical server is located on a remote virtualized logical server cloud.

* * * * *